United States Patent [19]

Halter

[11] 4,045,057
[45] Aug. 30, 1977

[54] VIBRATION BARRIER/STRUCTURAL CONNECTOR FOR CONDUITS AND THE LIKE

[75] Inventor: Edmund John Halter, Irving, Tex.

[73] Assignee: Burgess Industries Incorporated, Dallas, Tex.

[21] Appl. No.: 654,119

[22] Filed: Feb. 2, 1976

[51] Int. Cl.² .............................................. F16L 55/04
[52] U.S. Cl. ...................................... 285/49; 181/50; 285/286
[58] Field of Search ................. 285/49, 226, 223, 286; 181/50, 42; 64/11 B, 13, 11 R

[56] References Cited

U.S. PATENT DOCUMENTS

| 2,126,706 | 8/1938 | Schmidt | 285/49 |
| 2,233,804 | 3/1941 | Bourne | 181/50 |
| 2,920,656 | 1/1960 | Bertolet, Jr. | 285/226 |
| 3,061,039 | 10/1962 | Peters | 181/42 |
| 3,190,680 | 6/1965 | Maly | 285/49 |
| 3,232,640 | 2/1966 | Donkle, Jr. | 285/226 X |
| 3,606,392 | 9/1971 | Garrett | 285/49 |
| 3,894,610 | 7/1975 | Halter et al. | 181/50 |

FOREIGN PATENT DOCUMENTS

| 1,650,009 | 8/1970 | Germany | 285/49 |
| 306,733 | 7/1955 | Switzerland | 285/226 |
| 722,241 | 1/1955 | United Kingdom | 285/226 |

Primary Examiner—Thomas F. Callaghan
Attorney, Agent, or Firm—Darbo, Robertson & Vandenburgh

[57] ABSTRACT

For interrupting the transmission of vibration along a conduit, e.g., a pipeline or silencer shell, while structurally connecting the parts together, a vibration damping device is interposed in the conduit, the vibration barrier/structural connector comprising a series of spaced washer-shaped plates with vibration damping cushions sandwiched between adjoining plates, the plates being fastened together in couples alternately at their outer and inner peripheries to provide a multiple cantilever connector between the portions of the conduit to which the end plates of the connector are secured.

5 Claims, 5 Drawing Figures

U.S. Patent   Aug. 30, 1977   4,045,057
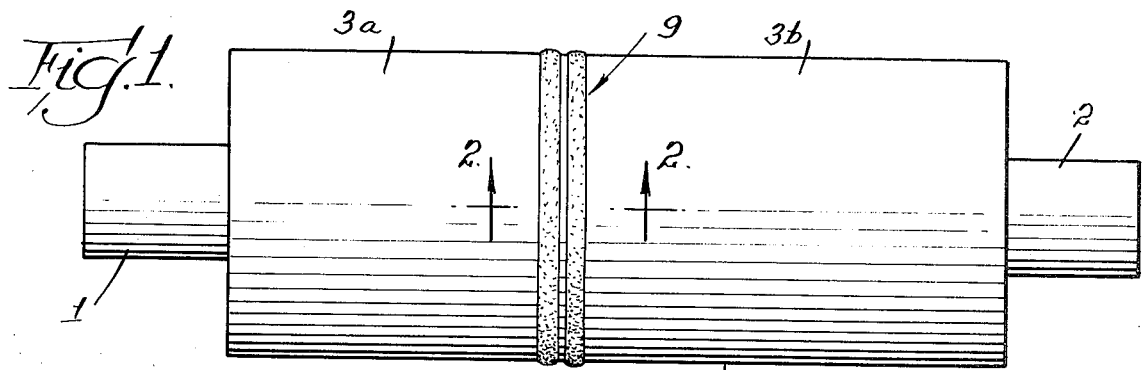
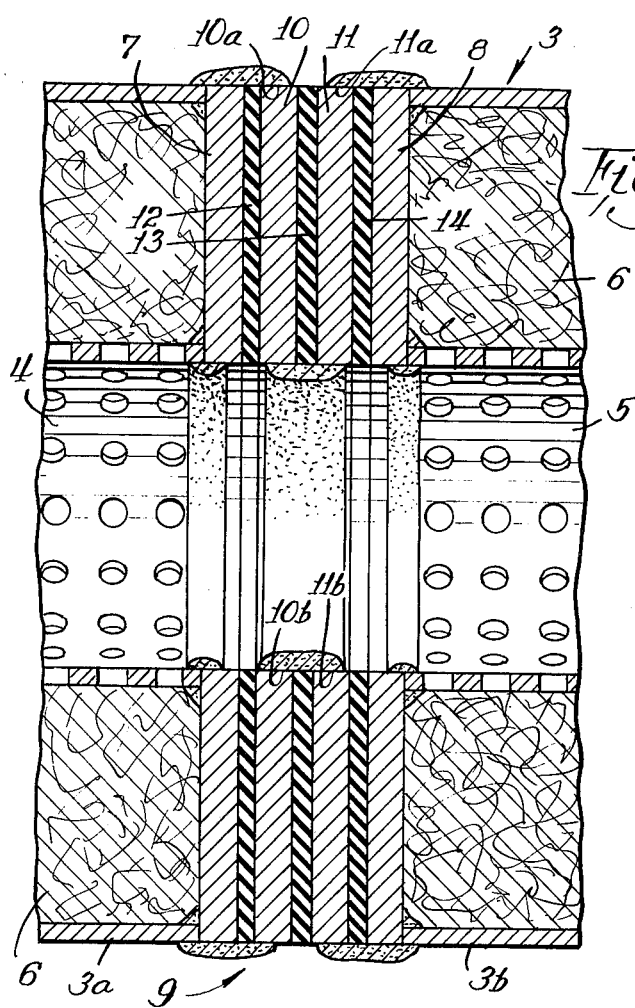
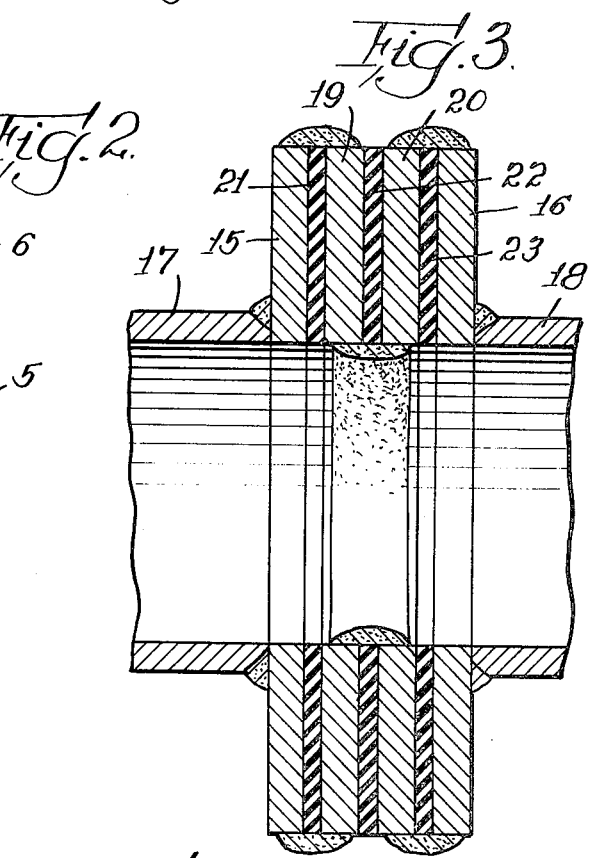
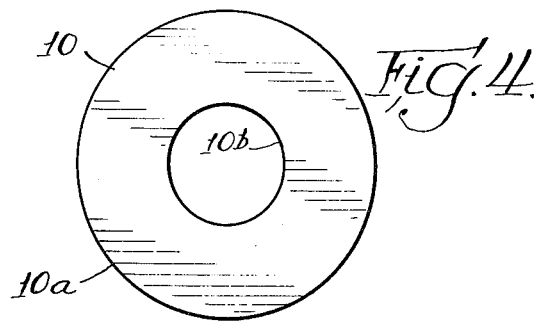
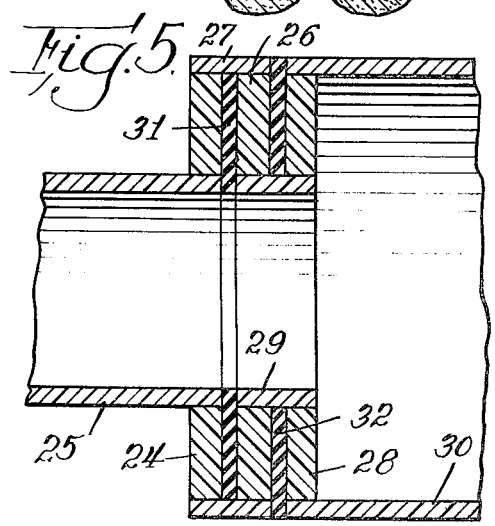

VIBRATION BARRIER/STRUCTURAL CONNECTOR FOR CONDUITS AND THE LIKE

BACKGROUND AND SUMMARY OF THE INVENTION

Processing and manufacturing plant structures exposed to vibrating or pulsating bodies may themselves be driven in vibration. Whether transmitted mechanically or caused by the impact of pulsating fluid flow, unless controlled such vibrations may result in mechanical damage to the structures or to equipment with which they are connected or may create undesirable noise in the vicinity of the structures.

Pipelines and other conduits carrying fluids from pumps and the shells or housings of silencers and snubbers connected in such conduits are examples of structures that may be set in vibration which must then be at least substantially mitigated.

Vibration barriers for such applications have long been known; see, for example, the vibration isolating structure of U.S. Pat. No. 3,894,610.

The object of the present invention is to provide a vibration barrier adapted to be interposed in a conduit to prevent the transmission of vibration along the conduit. Since the barrier device is interposed in the conduit, it must also serve to structurally connect and support the vibrating and non-vibrating portions of the conduit. More specifically, the object of the invention is to provide a vibration barrier for interposition in a conduit comprising a series of cantilevers and vibration damping means associated with each cantilever element whereby vibrational energy transmitted to one end of the connector is damped in stages so that little or no vibration is transmitted through and beyond the connector in the conduit. A futher object is to provide such a vibration barrier at very low cost.

DESCRIPTION OF THE DRAWINGS

In the accompanying drawings,

FIG. 1 is a side view of a typical silencer having the vibration barrier mounted therein;

FIG. 2 is a cross-sectional view taken at the line 2—2 of FIG. 1;

FIG. 3 is a cross-sectional view similar to that of FIG. 2 but showing the barrier interposed in a pipeline;

FIG. 4 is a plan view of a barrier plate, and

FIG. 5 is a cross-sectional view of a barrier/connector of plastic material.

DESCRIPTION OF SPECIFIC EMBODIMENTS

Illustrative embodiments and applications of the novel vibration barrier/structural connector are shown and described herein as used to vibrationally isolate one end of a silencer (FIGS. 1 and 2), interrupt the transmission of vibration in a pipeline or intake or outlet silencer nozzle (FIG. 3) and as employed to prevent the transmission of vibration between a nozzle and the shell of a plastic silencer structure (FIG. 5).

The typical silencer illustrated in FIG. 1 has an inlet nozzle 1, an outlet nozzle 2 and a housing shell 3 which encloses the interior silencing structure including perforated tubes 4 and 5 and sound absorbing media 6. Washer-shaped headers 7 and 8 span the spaces between the perforated tubes and the shell, closing the media-filled chambers.

In accordance with the invention, the transmission of vibration from one end of the shell to the other is prevented, or at least substantially mitigated, by the interposition of the vibration barrier 9. If it is assumed that shell end portion 3a is driven in vibration by a vibrating inlet nozzle 1, or by the pulsations of a fluid stream conducted into the inlet end of the silencer through the inlet nozzle, the function of the vibration barrier 9 is to vibrationally isolate vibrating shell portion 3a so that shell end portion 3b is not subjected to vibration and outlet nozzle 2 will not drive the pipe or other structure with which it is connected in vibration.

The vibration barrier 9 is composed of washer-shaped plates 10 and 11 which are substantially coextensive with header plates 7 and 8 and are spaced therefrom and from each other. Plates 10 and 11 are securely fastened at their outer peripheries 10a and 11a, respectively, with the outer peripheries of headers 7 and 8 by welding, as indicated. Plates 10 and 11 are not fastened together at their outer peripheries but are welded together at their inner peripheries 10b and 11b, as indicated. Bodies of vibration damping material, in the form of washers 12, 13 and 14, are sandwiched between the plates and between the plates and headers to occupy the spaces between these parts.

Assuming that silencer shell 3 is composed of steel, headers 7 and 8 and plates 10 and 11 would also normally be fabricated from steel, giving them necessary structural strength.

The vibration barrier-structural connector that emerges is a cantilever labyrinth which structurally connects the two portions of the silencer between which it is interposed. Thus, plate 10, which is firmly fastened at its outer periphery to header 7, serves as a cantilever to support plate 11 since it is securely fastened thereto at the inner peripheries of these plates. Plate 11 also serves as a cantilever to support header 8 to which it is securely fastened at the outer periphery of plate 11.

Since the outer peripheries of plates 10 and 11 are not fastened together, vibration of shell end portion 3a is not conducted to shell end portion 3b except as such vibrations may travel through the cantilever labyrinth structure since cushion 13 is essentially a non-conductor of vibrations at normal frequencies encountered. While the outer peripheral portion of plate 10, being securely fastened to header 7, will be driven in vibration by a vibrating shell portion 3a and header 7, such vibration of the outer peripheral portion of plate 10 is conducted only poorly to the inner peripheral portion of this plate and from the inner peripheral portion of plate 11 to the outer peripheral portion 11a, the vibration of the cantilever plates being greatly damped by the interfacing bodies 12, 13 and 14 of vibration damping material.

Materials having vibration damping characteristics are well known. An illustration of such a material is asbestos filled rubber. Such a body is resistively compressible and is elastically coupled only very inefficiently with the cantilever plates due to the inherent non-responsiveness of the gross body. The result is that the vibration barrier/structural connector described greatly impedes the transmission of vibration throughout its length so that shell end portion 3b of the silencer is substantially isolated from the vibrations manifested in shell end portion 3a.

In FIG. 3, the vibration barrier is shown as installed in a pipeline or in, for example, the inlet or outlet nozzle of a silencer. The outermost barrier plates 15 and 16 are welded at their inner peripheries to the end portions 17 and 18, respectively, of a pipe. The outer peripheries of plates 15 and 16 are securely fastened, as by welding, to the outer peripheries of spaced barrier plates 19 and 20 and the inner peripheries of plates 19 and 20 are fastened together as by welding. The cantilever labyrinth thus formed structurally supports the end portions of pipes 17 and 18. Washer-shaped bodies 21, 22 and 23 of vibration damping material are sandwiched between the four plates.

As is above described, vibratory motion of, for example, pipe end portion 17, mechanically transmitted to the inner peripheral portion of plate 15, is progressively damped as the vibrating action tends to travel through the structural cantilevers to the distal end of the vibration barrier/structural connector where it is connected with pipe end portion 18. Thus, pipe portion 18 is not subjected to the undesirable vibration.

For low temperature applications pipes and even silencer structures may be composed of plastic. A vibration barrier/structural connector of plastic material is illustrated in FIG. 5. A first washer-shaped plate 24 is cemented upon the inner end of inlet nozzle 25. A second barrier plate 26 is securely fastened at its outer periphery to the outer periphery of plate 24 by means of a band 27 of plastic material. Similarly, the inner peripheries of plate 26 and a third barrier plate 28 are fastened together by a plastic tubular section 29. The shell 30 of a silencer is cemented to the outer periphery of plate 28.

In the manner above described, washer-shaped bodies 31 and 32 of vibration damping material are sandwiched between the vibration barrier plates. This cantilever labyrinth structure with the vibration damping material embodied therein serves to prevent the transmission of vibration between inlet nozzle 25 and shell 30.

It will be understood that the number of cantilever plates employed in the vibration barrier will depend upon the magnitude of the vibration problem. Since the vibratory motion is progressively damped from the input to the distal end of the barrier/connector, the effectiveness of the barrier increases with the number of plates. The barrier illustrated in FIG. 2 employs two cantilever plates, that of FIG. 3 incorporates four such plates, and the barrier structure of FIG. 5 employs three cantilever plates. In FIG. 2, the damping accomplished by interfacing plates 10 and 11 and vibration damping body 13 is augmented by the interaction of plates 10 and 11 and vibration damping bodies 12 and 14.

Although, as is explicitly shown in FIG. 4, the washer-shaped plates 10 and 11 and the washer-shaped vibration damping bodies 12, 13 and 14 are circular, they may, with equal effectiveness, be elliptical or otherwise shaped to conform to the shape of the silencer with which they are used.

While the vibration barrier/structural connector of this invention exhibits satisfactory performance characteristics, being equal to or somewhat better than the vibration isolating connection structures shown in U.S. Pat. No. 3,894,610, they have a distinct advantage costwise. It is estimated that the cost of the barrier/connector of the present invention is approximately thirty percent less than that of the corresponding structure of the patent.

I claim:

1. A vibration barrier/structural connector for conduits and the like comprising a plurality of spaced parallel substantially coextensive rigid structural plates, said plates being washer-shaped with outer and inner peripheries, the outermost plate at each end of the connector being adapted to be fastened at one of said peripheries to an end of the conduit in which said connector is to be interposed, said outermost plates being securely fastened to the respective adjoining plates at the other of said peripheries and any intermediate plates being alternately securely fastened together at one and then the other of said peripheries to form a cantilever labyrinth from one end to the other of said connector, and vibration damping bodies composed of material having the vibration damping characteristics of asbestos-filled rubber substantially coextensive with said plates sandwiched between adjoining plates in said labyrinth.

2. A connector in accordance with claim 1 wherein the structural plates are composed of steel and are fastened together by welding.

3. A connector in accordance with claim 1 wherein the structural plates are composed of stiff plastic material.

4. In a silencer having a housing shell, means for interrupting the transmission of vibration of one end of said shell to the other end of said shell, said means comprising a vibration barrier/structural connector constructed in accordance with claim 1 and interposed intermediate the ends of said shell, the portions of said shell adjoining said connector being securely fastened to one of the peripheries of the respective outermost plates of said connector.

5. Structure in accordance with claim 4 wherein the shell is fastened to the outer periphery of the outermost plate at each end of said connector.

* * * * *